United States Patent
Komanduri et al.

(10) Patent No.: US 7,252,576 B1
(45) Date of Patent: Aug. 7, 2007

(54) METHOD AND APPARATUS FOR MAGNETIC FLOAT POLISHING

(75) Inventors: Ranga Komanduri, Stillwater, OK (US); Tejas Shrikant Kirtane, Downey, CA (US); Robert Edward Gerlick, Spokane Valley, WA (US); Noritsugu Umehara, Aichi (JP); Vijay Kumar Jain, Kanpur (IN)

(73) Assignee: The Board of Regents for Oklahoma State University, Stillwater, OK (US)

( * ) Notice: Subject to any disclaimer, the term of this patent is extended or adjusted under 35 U.S.C. 154(b) by 0 days.

(21) Appl. No.: 11/358,686

(22) Filed: Feb. 21, 2006

(51) Int. Cl.
*B24B 1/00* (2006.01)

(52) U.S. Cl. .............. 451/36; 451/50; 451/57

(58) Field of Classification Search ........... 451/36, 451/37, 39, 40, 49, 50, 52, 56, 57; 29/899, 29/899.1
See application file for complete search history.

(56) References Cited

U.S. PATENT DOCUMENTS

| | | | |
|---|---|---|---|
| 3,660,942 A | 5/1972 | Messerschmidt | |
| 3,695,934 A | 10/1972 | Feldhaus et al. | |
| 3,984,945 A | 10/1976 | Messerschmidt | |
| 4,010,574 A | 3/1977 | Feierabend et al. | |
| 4,216,629 A | 8/1980 | DeGaeta | |
| 4,306,386 A | 12/1981 | Sakulevich et al. | |
| 4,821,466 A * | 4/1989 | Kato et al. ................ | 451/36 |
| 4,965,967 A | 10/1990 | London | |
| 5,048,238 A | 9/1991 | Ikeda | |
| 5,070,658 A | 12/1991 | Rajner et al. | |
| 5,185,957 A | 2/1993 | Mizuguchi et al. | |
| 5,214,884 A | 6/1993 | Kinoshita et al. | |
| 5,384,989 A | 1/1995 | Shibano | |
| 5,449,313 A | 9/1995 | Kordonsky et al. | |
| 5,460,566 A | 10/1995 | Trahan | |
| 5,575,706 A | 11/1996 | Tsai et al. | |
| 5,577,948 A * | 11/1996 | Kordonsky et al. ........... | 451/35 |
| 5,578,238 A | 11/1996 | Weiss et al. | |
| 5,931,718 A * | 8/1999 | Komanduri et al. .......... | 451/36 |
| 5,957,753 A * | 9/1999 | Komanduri et al. .......... | 451/36 |
| 6,171,179 B1 * | 1/2001 | Chiou et al. ................. | 451/262 |

FOREIGN PATENT DOCUMENTS

| | | |
|---|---|---|
| WO | WO 95/20465 | 8/1995 |
| WO | WO 99/47304 | 9/1999 |

OTHER PUBLICATIONS

Bhagavatula, et al., On Chemomechanical Polishing of SI3N4 With CR203, *Philosophical Magazine*, 1996, Publisher: 1996 Taylor & Francis Ltd., vol. 74, No. 4, p. 1003-1017.

(Continued)

*Primary Examiner*—Dung Van Nguyen
(74) *Attorney, Agent, or Firm*—Fellers, Snider, Blankenship, Bailey & Tippens

(57) ABSTRACT

A method of polishing workpieces in a magnetic float polishing chamber comprising a lower chamber piece and an upper chamber piece which is removably receivable in the lower chamber piece and is connected to a powered spindle for rotating the upper chamber piece in the polishing operation. The method preferably comprises one or more of the steps of (a) geometrically aligning the upper chamber piece with the powered spindle by machining the upper chamber piece in-situ, (b) machining the contact surface of the upper chamber piece in-situ between various polishing runs, and (c) mounting the lower chamber piece in a manner effective for causing the lower piece to automatically self-align coaxially with the upper chamber piece.

18 Claims, 3 Drawing Sheets

OTHER PUBLICATIONS

Childs, et al., Magnetic Fluid Grinding of Ceramic Balls, *Tribology International*, 1995, Publisher: 1995 Elsevier Science Ltd., vol. 28, No. 6, 00. p. 341-348.

Childs, et al., Magnetic Fluid Grinding Cell Design, 1992, Publisher: 1992 CIRP Annals.

Fox, et al., Magnetic Abrasive Finishing of Rollers, 1994, Publisher: 1994 *CIRP Annals*, vol. 43/1.

Komanduri, et al., On the Possibilty of Chemomechanical Action in Magnetic Float Polishing of Silicon Nitride, 1996, Publisher: 1996 *Journal of Tribology*, vol. 118, p. 721-727.

Raghunadan, et al., Magnetic Float Polishing of Ceramics, *Journal of Manufacturing Science and Engineering*, 1997, Publisher: 1997 ASME: J Manufacturing, vol. 119, p. 001-009.

Umehara, et al., Magnetic Fluid Grinding of HIP-SI3N4 Rollers, 1995, Publisher: 1995 Elsevier Science S.A., *Wear*, 00, p. 1-8.

Umehara, et al., Principles of Magnetic Fluid Grinding of Ceramic Balls, *Applied Electromagnetics in Materials*, 1990, Publisher: 1990 Elsevier Science Publishers, p. 37-43.

Murkov, Abrasive Polishing Machine, 1983, Publisher: Derwent Publications Ltd.

Patent Abstracts of Japan JP 59 014461 Published Jan. 25, 1984.

Patent Abstracts of Japan JP 08257897, Published Oct. 8, 1996.

Patent Abstracts of Japan JP 02009567, Published Jan. 12, 1990.

* cited by examiner

METHOD AND APPARATUS FOR MAGNETIC FLOAT POLISHING

STATEMENT REGARDING FEDERALLY SPONSORED RESEARCH

The Government of the United States of America has certain rights in this invention pursuant to Grant No. DMI-0000079 awarded by the National Science Foundation.

FIELD OF THE INVENTION

The present invention relates to magnetic float polishing methods and apparatuses for polishing ceramic balls and other workpieces.

BACKGROUND OF THE INVENTION

Traditional rolling element bearings made from AISI 52100 bearing steel or M50 high-speed steel are limited in performance for use at very high speeds, high temperatures, and corrosive environments. They need adequate lubrication for satisfactory operation and optimum life. Over the past decade or so, silicon nitride ($Si_3N_4$) balls have become an important component in advanced bearings. They are most successfully used in hybrid bearings (SNHB). $Si_3N_4$ is typically the preferred material because it offers many desirable properties, such as high hardness, high thermal and chemical stability, low density, high Young's modulus, high stiffness, good fatigue life, low friction, and high wear resistance.

The lower density of $Si_3N_4$ balls reduces the gyroscopic slip and centrifugal loading on the outer steel race. This reduces friction, heat, and wear of the bearing elements. $Si_3N_4$ balls do not react with the steel race and hence, micro-welding can be avoided resulting in longer bearing life. SNHB are well suited for applications where marginal lubrication is required and are less sensitive to the lubricant type, lubricant contamination, and lubricant starvation. Higher rigidity, excellent surface finish and sphericity of $Si_3N_4$ balls reduces noise and vibrations of these bearings, thus enabling higher speeds.

The benefits listed above make $Si_3N_4$ hybrid bearings (SNHB) suitable for high speed and high temperature applications, such as turbines, machine tool spindles, dental drills, liquid oxygen pumps, and turbo molecular pumps. All-ceramic bearings ($Si_3N_4$ balls in $Si_3N_4$ races), on the other hand, can operate at higher temperatures, far outside the range of SNHB (−40 to +200° C.). They perform well in aggressive environments such as semiconductor processing, infrared missile seekers, and tidal flow meters. However, their use is limited mainly due to the difference in the thermal expansion coefficient between the metal drive shaft and the inner ceramic race, and hence, SNHB are preferred for most other applications.

Compared to traditional steel bearings, SNHB, in general, can more easily meet the requirements of higher efficiency, higher reliability, higher accuracy, higher speed, greater stiffness, longer life, lower friction, corrosion resistance, marginal lubrication, and lower maintenance costs.

The failure mode of $Si_3N_4$ balls is by fatigue flake-off which is similar to metallic rolling elements due to its higher fracture toughness. The performance and reliability of ceramic rolling element bearings depend on the quality of the resulting surface. Ceramics have high hardness and inherent brittleness. They are sensitive to defects resulting from grinding and polishing processes. Fatigue failure begins at regions of surface irregularities, such as scratches, pits, and microcracks. Hence, it is important to produce superior quality and finish with minimum defects in order to obtain reliability in performance.

In industry, ceramic balls have heretofore been finished by conventional grinding followed by V-groove lapping. This is essentially the same technique used for finishing steel balls. The balls run in 3-point contact in a V-groove. The balls revolve around the pad and at the same time rotate continuously. They glide and roll relatively against the contacting surfaces of the pad. The process uses high loads (about 10 N per ball), low polishing speeds (about 50 rpm), and a diamond abrasive. Due to lower speeds, considerable time (6-16 weeks) is required for finishing a batch of ceramic balls from the as-received condition to the finished condition. Thus, the long processing time and the use of expensive diamond abrasive result in high processing costs. Furthermore, the use of a diamond abrasive under heavy loads can result in scratches, pits, and microcracks on the surface and subsurface of the polished balls. These surface defects can act as nucleation sites for cracks resulting in catastrophic failure by large brittle fracture.

In order to prevent such failures, it is necessary to minimize the surface damage as much as possible. For this purpose, gentle polishing conditions are required, namely, a low level of controlled force and abrasive which are not significantly harder than the work material. High material removal rates and shorter polishing times can be obtained using high polishing speeds. This is accomplished by a process known as magnetic float polishing (MFP).

MFP processes typically use low loads (about 1 N per ball), high speeds (about 2000 rpm with a 2.5 inch diameter upper part of the chamber in the small batch apparatuses and about 500 rpm with a 12.2 inch diameter upper part of the chamber in large batch apparatuses), and abrasives such as $B_4C$, SiC, and $CeO_2$. For ¾ inch ceramic balls, a typical small batch apparatus will process a batch of about six balls whereas a large batch apparatus will typically hold a batch of about 46 balls. Similarly, 10 balls of ½ in. diameter and 15 balls of ⅜ in. diameter can typically be finished by a small batch apparatus as compared to about 69 balls of ½ in. diameter and about 104 balls of ⅜ in. diameter in the large batch apparatus. An actual polishing time of 20-30 hours is typically required to finish a batch from the as-received condition.

The processing time is not affected by the number of balls used in a given apparatus. For example, a modified float chamber having multiple ball tracks or rows can take 100-200 balls of ¾ in. diameter instead of 46 used in the single track apparatus, and yet, it will take about the same amount of time to polish them.

Magnetic float polishing MFP is based on the magnetohydrodynamic behavior of a magnetic fluid that can levitate all non-magnetic materials suspended in it. A bank of permanent magnets (Nd—Fe—B) is arranged with alternate N and S poles below an aluminum chamber filled with the required amount of magnetic fluid and an appropriate abrasive (5 to 10% by volume). The magnetic fluid (also called ferrofluid) is a colloidal dispersion of extremely fine (100 to 150 Å) sub-domain ferromagnetic particles, usually magnetic ($Fe_3O_4$) in a carrier fluid, such as water or hydrocarbons (e.g., kerosene). Water in the magnetic fluid not only acts as a coolant but also participates in the chemical reaction with the work material during the polishing process. The ferrofluids are made stable against particle agglomeration by the addition of surfactants.

When a magnetic field is applied, the $Fe_3O_4$ particles are attracted downwardly towards the area of higher magnetic field and a resultant upward buoyant force is exerted on all of the non-magnetic materials, to push them upwardly toward the area of lower magnetic field. The abrasive grains, ceramic balls, and the acrylic float inside the chamber, all being non-magnetic materials, are levitated by the magnetic buoyant force.

The magnetic float polishing chamber is preferably installed in and operated using a machining tool (e.g., a Bridgeport vertical machining center). An upper piece of the polishing chamber is lowered into a lower chamber piece to make contact with the balls and to press them down to reach the desired level of force or height. A piezoelectric dynamometer, placed between the chamber and machine tool table, is used to measure the exact loading. The balls are polished by the abrasive grains under the action of the magnetic buoyancy levitational force when the upper piece of the polishing chamber is rotated by the machine tool spindle. A damage-free surface on ceramic balls is expected by the magnetic float polishing technique because the magnetic buoyant force (typically about 1 N/ball) is applied via a flexible acrylic float positioned in the polishing chamber beneath the workpieces. The function of the acrylic float is to produce a uniform, larger polishing pressure. A urethane rubber sheet is glued to the inner guide ring of the polishing chamber to protect it from wear. The material of the upper piece of the chamber is non-magnetic, austenitic stainless steel.

Once the balls are reasonably uniform in size, uniform removal of material from the ball surface is essential for obtaining good sphericity. Heretofore, this has been particularly problematic in large batch apparatuses, especially with large balls having large surface area, which increases as the square of the diameter of the balls. The apparatus and set up procedures currently used in the art are not capable of consistently and efficiently achieving the precise required geometric alignment and coaxially of the upper and lower polishing chamber pieces with each other and with the powered machine tool spindle.

The coaxiality of the upper piece of the polishing chamber with the machine tool spindle is particularly important but has been very difficult to accomplish. Heretofore, the upper chamber piece has been formed using precision machining techniques and then secured to the drive spindle of the machine used for the ball polishing operation.

Establishing and maintaining coaxiality between the upper and lower pieces of the polishing chamber has proved to be even more difficult to achieve and is one of the most significant factors affecting the results. If the upper and lower pieces of the polishing chamber are not aligned properly, unequal loading will result, which will cause higher material removal rates at areas of higher loading. This means that, as a ball circulates around the chamber, some areas of the ball's surface will be machined more than others, thereby severely degrading the ball's sphericity. Also, this unequal loading is a source of vibration, which again has the same effect.

SUMMARY OF THE INVENTION

The present invention addresses the needs and alleviates the problems discussed above. In one aspect, there is provided a method of polishing workpieces in a magnetic float polishing chamber, the magnetic float polishing chamber comprising a lower chamber piece and an upper chamber piece which is removably receivable in the lower chamber piece, the upper chamber piece is connected to a powered spindle for rotating the upper chamber piece in the lower chamber piece. The method comprises the steps of: (a) geometrically aligning the upper chamber piece with the powered spindle by machining the upper chamber piece while the upper chamber piece is connected to and is being rotated by the powered spindle and then (b) polishing the workpieces in the lower chamber piece by rotating the upper chamber piece in the lower chamber piece using the powered spindle.

In another aspect, there is provided a method of polishing workpieces in a magnetic float polishing chamber, the magnetic float polishing chamber comprising a lower chamber piece and an upper chamber piece which is removably receivable in the lower chamber piece, the upper chamber piece having a contacting surface for contacting the workpieces. The method comprises the steps of: (a) performing a first polishing stage wherein the workpieces are polished in the lower chamber piece in the presence of a first abrasive material by rotating the upper chamber piece in the lower chamber piece, the first polishing stage comprising a plurality of first stage polishing runs using the first abrasive material and (b) performing a second polishing stage wherein the workpieces are further polished in the lower chamber piece in the presence of a second abrasive material by rotating the upper chamber piece in the lower chamber piece, the second abrasive material being less coarse than the first abrasive material. The method further comprises the step, after one of the first stage polishing runs, of removing a groove from the contacting surface prior to beginning a subsequent one of the first stage polishing runs.

In another aspect, there is provided a method of polishing workpieces in a magnetic float polishing chamber, the magnetic float polishing chamber comprising a lower chamber piece and an upper chamber piece which is removably receivable in the lower chamber piece. The method comprises the steps of: (a) polishing the workpieces in the lower chamber piece by rotating the upper chamber piece in the lower chamber piece and (b) prior to step (a), mounting the lower chamber piece beneath the upper chamber piece in a manner effective for causing the lower chamber piece to automatically self-align coaxially with the upper chamber piece during step (a).

In another aspect, there is provided an apparatus for finishing ceramic balls (e.g., large size/large batch silicon nitride ($Si_3N_4$) balls for hybrid bearing applications) and other workpieces by magnetic float polishing (MFP). The lower piece of the apparatus polishing chamber is preferably so designed that, during polishing, it can self-align with the upper part of the polishing chamber connected to the spindle. In-situ machining of the upper piece of the chamber is also preferably performed in order to achieve high accuracy and geometric alignment of the system.

The finishing methodology preferably comprises mechanical polishing followed by chemo-mechanical polishing. Boron carbide ($B_4C$), silicon carbine (SiC), and cerium oxide ($CeO_2$) are examples of three abrasives preferred for use. Three stages are preferably involved in polishing, namely, (1) a roughing stage to remove maximum material without imparting any damage to the workpiece surface, (2) an intermediate stage of semi-finishing to control size and improve sphericity, and (3) a final finishing stage to obtain the best surface finish and sphericity while maintaining the final diameter. The Taguchi method is preferably employed at least for the roughing stage to optimize the polishing conditions for the best material removal rate.

Level average response analysis has indicated that, in the roughing stage for $Si_3N_4$ balls, a load of 1.5 N/ball, an abrasive concentration of 20%, and a speed of 400 rpm result in a high material removal rate using $B_4C$ (500 grit) abrasive. During the processes, a groove is formed on the beveled contacting surface of the upper part of the chamber which plays different roles, some beneficial and others not so beneficial, in each stage. In the roughing stage, it is preferable, though not essential, to machine the surface to remove the groove after each run to maintain high material removal rates. It is also preferable to remove the groove formed at the end of the roughing stage. In the intermediate or semifinishing stage, sphericity can be significantly improved by not machining the groove. However, before the beginning of the final finishing stage, machining the groove is preferable for achieving rapid improvement in the surface finish.

In one example, a batch of 46, ¾ in. $Si_3N_4$ balls was finished to a final diameter of 0.7500 in. with an average sphericity of approximately 0.25 μm (best value of 0.15 μm) and an average surface finish (Ra) of approximately 8 nm (best value of 6.7 nm) with an actual polishing time of less than 30 hours. The inventive method and apparatus can readily be implemented in industry and do not entail high capital investment.

Further aspects, features, and advantages of the present invention will be apparent to those in the art upon examining the accompany drawings and upon reading the following detailed description of the preferred embodiments.

DETAILED DESCRIPTION OF THE PREFERRED EMBODIMENTS

Figure 1:
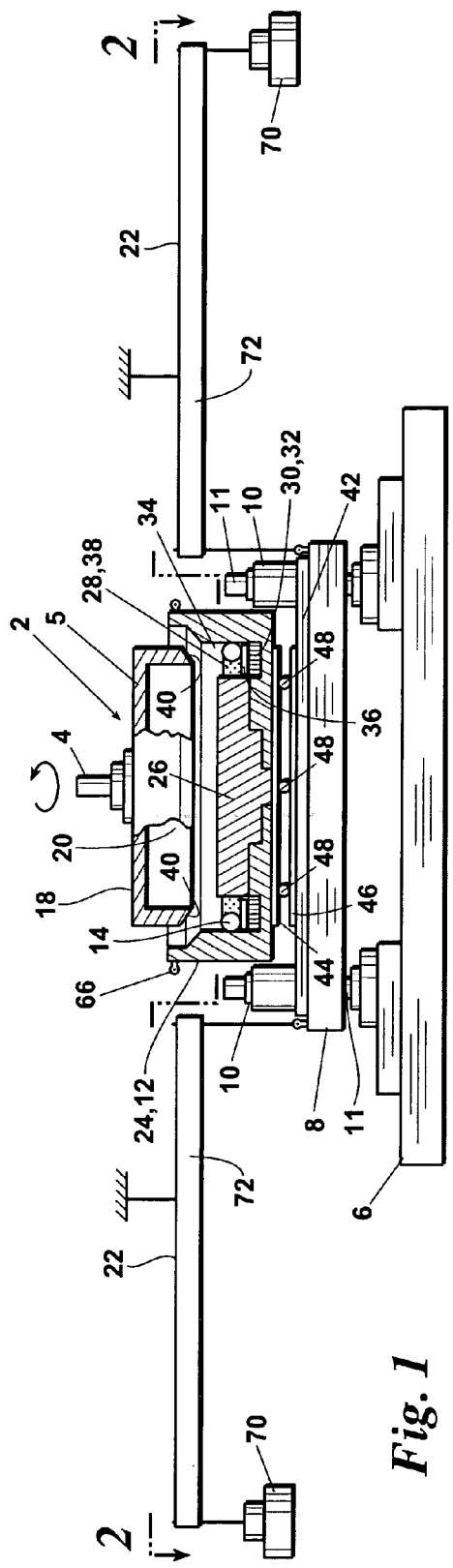
FIG. 1 is a cutaway elevational side view of an embodiment 2 of the inventive magnetic float polishing system.
Figure 2:
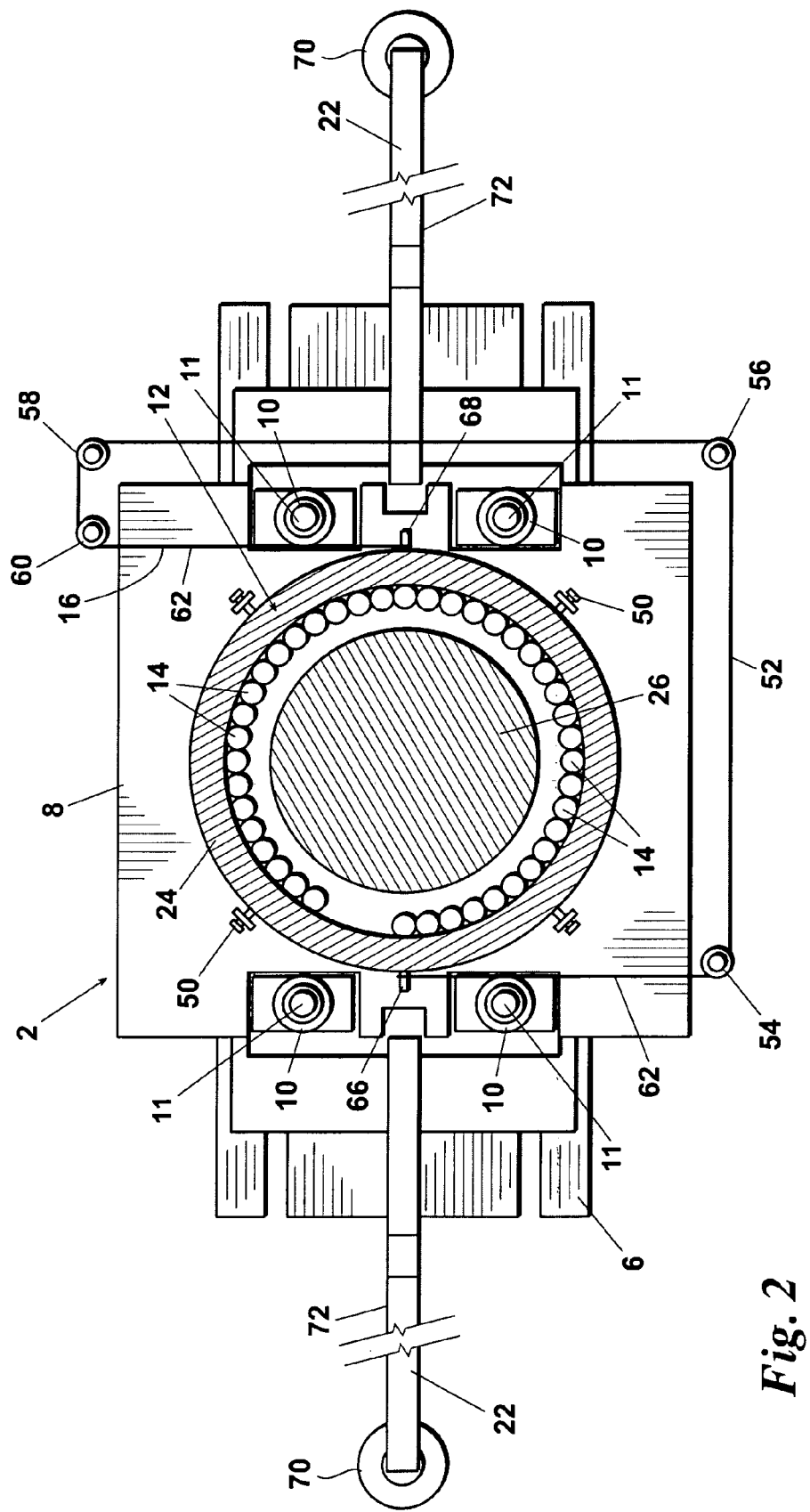
FIG. 2 is a cutaway plan view of the inventive magnetic float polishing system 2.

An embodiment 2 of the inventive magnetic float polishing system is shown in FIGS. 1 and 2. The inventive system 2 is installed in a machining tool (e.g., a Bridgeport vertical machining center) having a downwardly extending, powered spindle 4 which is positioned above a machine tool table 6. The inventive system 2 comprises: a work table 8 which is mounted on the machine tool table 6 using a plurality of linear bearings 10; a lower polishing chamber piece 12 in which the ceramic balls or other workpieces 14 are received; an inventive self-alignment assembly 16 which is used for mounting the lower chamber piece 12 on the work table 8; an upper polishing chamber piece 18 which is secured to the powered spindle 4 and is rotatably receivable in the open top 20 of the lower chamber piece 12; and a pair of opposing counterweight arm assemblies 22 which are connected to the work table 8.

The lower polishing chamber piece 12 includes: an outer float chamber 24; a centered disk 26 secured within the float chamber 24; a ball track 28 formed between the centered disk 26 and the interior wall of the float chamber 24; a magnetic base 30 which contains multiple permanent magnets 32 positioned under the ball track 28; a urethane liner 34 attached to the outer wall of the ball track 28; a flexible circular acrylic float piece 36 positioned in the ball track 28 beneath the workpieces 14; and a magnetic fluid 38 provided in the ball track 28. The upper chamber piece 18 includes a beveled circular edge or other contacting surface 40 which will contact the workpieces 14 during the polishing operation.

Although the polishing chamber 5 assembly of the inventive system 2 is depicted as including only one ball track 28 and a corresponding single contact surface 40, it will be understood that the system could alternatively include a plurality of concentric ball tracks and corresponding contact surfaces.

In one aspect of the present invention, the roundness and geometric alignment of the upper chamber piece 18 with the powered spindle 4 used for polishing is vastly improved by forming (i.e., machining) the upper chamber piece 18 in-situ. In other words, the unfinished upper chamber piece is installed in the machine tool on the spindle 4 and is driven by this same machine tool spindle 4 during the forming/machining process. All sides of the upper chamber piece 18—outer top, outer side, inner side, and inner top surface—are machined in place. Small depths of cut are preferably made to these surfaces until there are no longer any intermittent cuts. The inner surfaces can be machined with the aid of a mirror. To measure the accuracy of the upper piece 18 of the chamber 5 after machining, a dial indicator (0.0001 in. resolution) can be set perpendicular to all sides—inner and outer. In the example described below, the dial's needle showed no deflection, giving confidence that at least under static conditions, the upper piece 18 of the chamber 5 was co-axial with the machine tool spindle 4. The upper piece 18 of the chamber 5 can also be balanced in order to improve the sphericity further.

Figure 4:
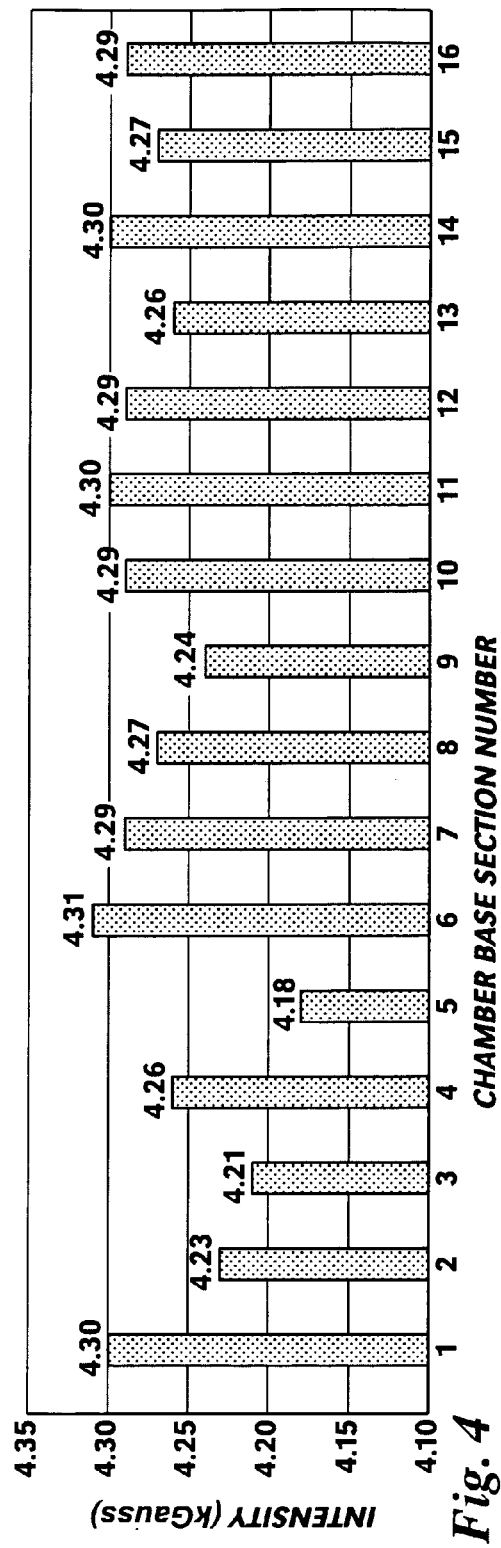
FIG. 4 illustrates the magnetic field intensity distribution of the magnetic base 30.
Figure 3:
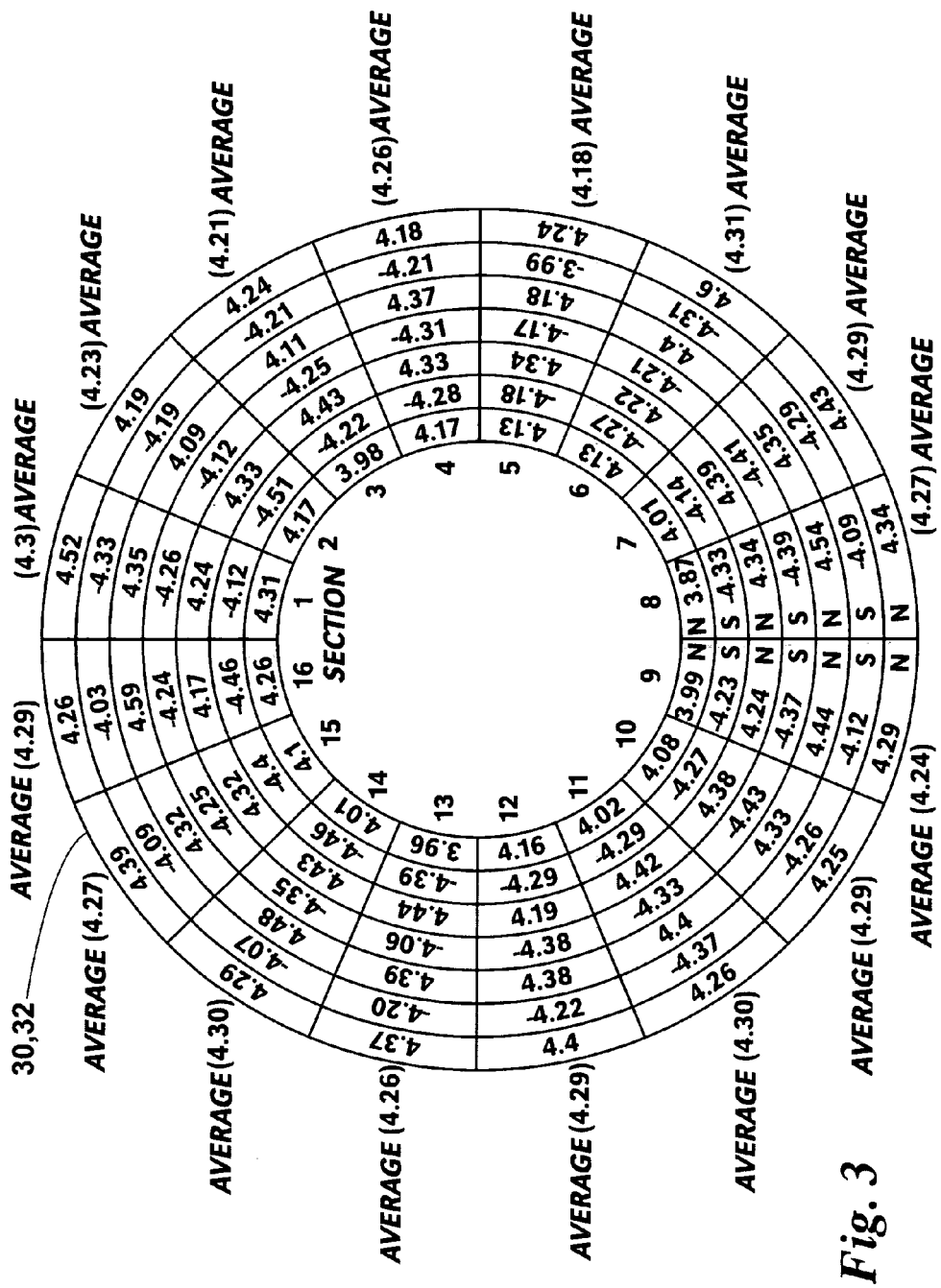
FIG. 3 illustrates the arrangement of magnets 32 in the magnetic base 30 employed in the inventive magnetic float polishing system 2 wherein each positive sign designates a north pole and each negative sign designates a south pole.

The upper piece 18 of the polishing chamber is preferably made of non-magnetic 304 L stainless steel with a beveled contacting edge 40 of 35°. It is attached to the powered spindle 4 in the arbor of the machine tool. The linear bearings 10 are used to allow the worktable to move vertically on four columns 11 mounted on the computer numerically controlled ("CNC") machine tool table 6. As will be understood by those in the art, an aluminum plate 42 is precisely leveled on top of the worktable 8. The lower chamber piece 12 is preferably an aluminum chamber with the permanent magnets 32 (preferably Nd—Fe—B) located in a steel base. The magnets 32 are mounted adjacent to each other with alternate N and S poles as shown in FIG. 3. The magnetic field intensity distribution of the chamber base is shown in FIG. 4. For uniform material removal, the magnetic field intensity should be uniform throughout the chamber. The inner surface of the chamber (i.e., the outer wall of the ball track 28) is covered with the urethane liner 34 to prevent wear due to the motion of the workpieces 14 and the magnetic fluid abrasive.

The inventive self-alignment assembly 16 is shown in FIGS. 1 and 2. An acrylic plate 44 (PMMA) is fixed (e.g., taped) to the bottom of the lower chamber piece 12 in order to provide a smooth surface. Another acrylic plate 46 is centrally placed on the aluminum plate 42 and a plurality of (preferably six) rolling elements 48, (e.g., ½ inch $Si_3N_4$ balls) are equally placed (60° apart) in dimples on the acrylic plate 46. The lower chamber piece 12 is then positioned on top of the rolling elements 48 and is temporarily held in place by means of four locking screws 50.

The inventive self-alignment assembly 16 further comprises a single cord (preferably a nylon string) 52 which runs through four pulleys 54-60 and is connected at its ends to the sides of the lower chamber piece 12, thus preventing rotation. The use of a single cord 52, versus two individual cords with each of the two cords connected at only one end, assures equal tension throughout and therefore exerts equal and opposite force on each side of the chamber 12 in the direction of pulling. Most preferably, the two end portions 62 of the cord 52 extending from the attachment pegs 66 and 68 on opposite sides of the chamber piece 12 are parallel to one another on each side of the chamber 12. Consequently, the resulting forces are exactly opposite to one another. The two end portions 62 of the cord 52 will preferably either (a) extend tangentially from the chamber piece 12 as shown in FIG. 2 or (b) will be secured so that they are perpendicular to the chamber wall on opposite sides thereof.

The workpieces 14 to be polished in the polishing chamber are placed on top of the acrylic float 36 and the ball track 28 of the lower chamber piece 12 is loaded with a mixture of magnetic fluid and abrasive 38. The magnetic fluid 38 is subjected to a magnetic field gradient in the vertical direction so that all non-magnetic materials are levitated by upward buoyancy force. The lower chamber piece 12 is moved under the upper part of the polishing chamber and a balancing weight for the entire set-up is applied on the counter-weight system. Additional weights 70 are applied depending upon the load requirement on the workpieces 14. The counter-weight system virtually eliminates any friction and the loading is highly controllable and repeatable.

The upper piece 18 of the chamber 5 is then brought down inside the lower chamber piece 12 and the gap between them is kept constant. The upper piece 18 of the chamber is further lowered to contact the workpieces 14 until the counter-weight arms 72 are flat with the desired level of load applied on the workpieces 14. The workpieces 14 make a 3-point contact, namely, with the beveled contacting surface 40 of the upper piece 18, the urethane liner 34 on the side of the chamber, and the float 36. As will be understood by those in the art, a cover (not shown) can also be placed on top of the chamber to prevent evaporation of the magnetic fluid 38 due to the heat generated in the process.

The locking screws 50 are then loosened and the powered spindle 4 is set into rotation. The smooth rolling elements 48 below the lower chamber piece 12 allow the lower chamber piece 12 to roll horizontally in any direction. The forces acting on the workpieces 14 from the upper piece 18 of the chamber 5 cause the lower chamber piece 12 to "self-align" so that a state of equilibrium is reached between the forces around the chamber 12. Once this state of equilibrium has been reached, the locking screws 50 are set to barely touch the chamber piece 12 during the operation.

In the lower chamber piece 12, the axis of the chamber wall should be perpendicular to the chamber bottom. Also, the inner surface of the chamber which comes into contact with the workpieces should have good roundness. In one option, the chamber surface can be an aluminum ring with its inner wall bonded to a ⅛ in. thick polyurethane (90 Shore A hardness) sleeve. The purpose of this sleeve is to prevent the abrasives from wearing the soft aluminum wall. However, continuous use of this ring can cause the chamber to become out of round. It is therefore preferred that, instead of the polyurethane sleeve aluminum ring, an aluminum ring having the a replaceable urethane liner 34 (preferably about 90 Shore A hardness and about 1 mm thick) be used. The thickness of this liner 34 should be closely matched at the junction in order to maintain proper ball motion.

Another factor regarding the lower chamber piece 12 that can significantly affect the results is the angle that the lower chamber piece 12 makes with respect to the upper piece 18 of the chamber 5. The base of the lower chamber piece 12 must be perpendicular to the spindle 4 axis, or the workpieces 14 will circulate in an elliptical pattern. This will cause uneven loading on the workpieces 14, leading to different material removal rates on different areas—thus damaging sphericity. To alleviate this, the leveling plate 42 is preferably used under the lower chamber piece 12. By using a dial gage between the upper piece 18 of the chamber 5 and chamber bottom, the leveling plate can be adjusted to maintain the parallelism between the two.

Abrasive wear occurs on the beveled contacting surface 40 of the upper piece 18 of the polishing chamber 5, on the acrylic float 36, and on the urethane liner 34 during the various stages of polishing. The float 36 and the liner 34 can be replaced periodically. However, a groove is formed on the beveled surface 40 of the upper piece 18. In one aspect of the present invention, the contacting surface 40 is periodically machined to remove the groove and obtain high material removal rates and a good surface finish. Maintaining the groove is favorable, however, for improving the sphericity of the balls, as will be shown later.

In our initial tests, the upper part of the polishing chamber connected to the spindle was removed from the machine tool and the beveled contacting surface 40 was machined on a lathe. However, it was discovered that it was then very difficult to re-install the upper chamber piece 18 to be exactly co-axial to the machine tool spindle 4. Thus, in accordance with another aspect of the present invention, we have discovered that in-situ machining of the groove between runs is the best approach, which results in no deflection on the dial gauge (resolution of 0.0001 inch) indicating no out-of-roundness. This also saves considerable time and effort.

EXAMPLE

In order to precision finish $Si_3N_4$ balls for hybrid bearing applications, three important characteristics, namely, diameter, sphericity, and surface finish have to be controlled very accurately. Tables 1 and 2 give the chemical composition as well as the mechanical and thermal properties, respectively, of NBD 200 HIP'ed $Si_3N_4$ balls (obtained from CERBEC) used in this investigation. The general methodology used for finishing the $Si_3N_4$ balls by magnetic float polishing consisted of mechanical polishing followed by chemo-mechanical polishing. Three stages were used in the magnetic float polishing of the $Si_3N_4$ balls, namely, (1) a roughing stage to remove the maximum amount of material from the $Si_3N_4$ balls without imparting any damage to the surface, (2) an intermediate, semi-finishing stage to precisely control diameter and improve sphericity, and (3) a final finishing stage to obtain best surface finish and sphericity while maintaining exact diameter. Table 3 gives some of the properties of the abrasives used in this investigation.

TABLE 1

Chemical Composition of NBD-200 $Si_3N_4$ balls

| Mg | Al | Ca | Fe | C | O | $Si_3N_4$ |
|---|---|---|---|---|---|---|
| 0.6-1.0 | ≦0.5 | ≦0.04 | ≦0.17 | ≦0.88 | 2.3-3.3 | 94.1-94.7 |

TABLE 2

Mechanical and thermal properties of $Si_3N_4$

| PROPERTY | VALUE |
|---|---|
| Flexural Strength, MPa | 800 |
| Weibull Modulus | 9.7 |
| Tensile Strength, MPa | 400 |
| Compressive Strength, GPa | 3.0 |
| Hertz Compressive Strength, GPa | 28 |

TABLE 2-continued

Mechanical and thermal properties of $Si_3N_4$

| PROPERTY | VALUE |
|---|---|
| Hardness, Hv (10 kg), GPa | 16.6 |
| Fracture Toughness, $K_{1c}$, $MNm^{-3/2}$ | 4.1 |
| Density, $g/cm^3$ | 3.16 |
| Elastic Modulus, GPa | 320 |
| Poisson's Ratio | 0.26 |
| Thermal Expansion Coefficient at 20-1000° C.,/° C. | $2.9 \times 10^{-6}$ |
| Thermal Conductivity at 100° C., W/m-K | 29 |
| Thermal Conductivity at 500° C., W/m-K | 21.3 |
| Thermal Conductivity at 1000° C., W/m-K | 15.5 |

TABLE 3

Properties of the abrasives used

| Abrasive | Density $g/cm^3$ | Knoop Hardness $kg/mm^2$ | Elastica modulus GPa | Melting point ° C. |
|---|---|---|---|---|
| $B_4C$ | 2.52 | 2800 | 450 | 2450 |
| SiC | 3.2 | 2500 | 420 | 2400 |
| $CeO_2$ | 7.13 | 625 | 165 | 2500 |

*All the abrasives except $CeO_2$ were obtained from Saint-Gobain Abrasives. $CeO_2$ was obtained from Aldrich Chemicals.

The groove formed on the beveled contacting surface of the upper piece of the polishing chamber played an important role one way or other in all the three stages of polishing. Two coarser, harder abrasives (with respect to $Si_3N_4$ balls), $B_4C$ (500 grit) and SiC (600 grit), were used in the roughing stage for rapidly reducing the ball diameter and simultaneously improving the ball sphericity. At this stage, it was beneficial to machine the groove, though not essential, in order to maintain high material removal rates (about 1-1.5 μm/min.) using $B_4C$ (500 grit) abrasive. The use of SiC (600 grit) abrasive resulted in a somewhat lower material removal rate (about 0.6 μm/min.) than $B_4C$ (500 grit) abrasive and hence was suitable at the end of the roughing stage to reach the desired diameter. It was, however, necessary to maintain the groove formed with SiC (600 grit) abrasive in order to improve the sphericity in the intermediate stage. Sphericity was significantly improved by not machining the groove during this stage. Moderate material removal rates were preferred in the intermediate stage in order to control the ball diameter. Fine SiC (1200 grit) abrasive was found to be suitable for this stage.

In the final finishing stage, the groove formed in the semi-finishing stage was machined for rapid improvement of the surface finish. Low material removal rates were used at this stage to control the final diameter. Ultrafine SiC (10,000 grit) abrasive was very effective in improving the surface finish and was used to approach the final diameter. This was followed by using a final chemo-mechanical polishing $CeO_2$ (<5 μm) abrasive to produce balls of the required diameter, sphericity, and surface finish by preferential removal of the peaks from the surface. The parameters used in this investigation are given Table 4.

TABLE 4

Polishing parameters used in this study

| Abrasive | Boron carbide ($B_4C$) - 500 grit (12 μm) |
| | Silicon carbide (SiC) - 600 grit (10 μm), |
| | 1200 grit (2.1 μm), 10000 grit (0.5 μm) |
| | Cerium oxide ($CeO_2$) - (<5 μm) |

TABLE 4-continued

Polishing parameters used in this study

| Abrasive (%) | 5, 10, 20 |
|---|---|
| Load (N/ball) | 0.5, 0.75, 1, 1.5 |
| Speed (rpm.) | 300, 400, 550 |
| Time (min.) | 60, 90, 105, 120, 180 |

The tests were conducted using the inventive apparatus and method described above. The unfinished upper piece of the polishing chamber was connected to the spindle of a vertical machining center (Bridgeport-Interact 412) with stepped speed regulation in the range of 40 to 4000 rpm and was then machined in-situ. The roundness of the upper piece of the chamber was measured using a dial gage (resolution: 0.0001 in.). The magnetic field was measured using a Gauss/Tesla meter. The ball diameter was measured using a micrometer (resolution: 0.0001 in.). The sphericity of the balls was measured using TalyRond 250 (Filter: 2CR, cut-off: 50 upr). The surface finish was measured using TalySurf 120L (Filter: ISO 2 CR, Cut-off 0.08 mm and Evaluation length 4 consecutive cut-off).

The material removal rate was calculated by measuring the weight before and after each polishing run using a precision balance (resolution: 0.1 mg.). The balls were thoroughly cleaned after each run before weighing. The polishing load was applied by adding weights on the side arms of the counter-weight system. The polishing force was measured using a Kistler's piezoelectric dynamometer connected to a charge amplifier and a display.

In this investigation, five balls were selected for measurement of the diameter and sphericity, and three balls were selected for measuring surface finish after each run. In all the measurements made for diameter, sphericity, and surface finish, each ball was traced in approximately three orthogonal planes. The ASTM standards for the tolerance by grade for individuals balls and ball lots are given Tables 5 and 6. The letter C in the tables indicates ceramic material used, which in the present case is silicon nitride.

About 300 ml of magnetic fluid was used in each run. However, the magnetic fluid level drops with time due to evaporation and overflow while rotating, especially at higher loads and higher speeds. The fluid level was maintained either by the addition of water and/or magnetic fluid. Apart from the actual polishing time, a cleaning time of about 30 min., an in-situ groove machining time of about 20 min., a characterization time of about 60 min., and a set-up time of about 30 min. were required. These times can be shortened in the production phrase by partial automation and in-process sensing.

TABLE 5

Tolerances by grade for individual balls μm (μin.)

| Grade | Allowable Ball Diameter Variation ($V_D$) | Allowable Deviation from Spherical Form (W) | Maximum Surface Roughness Arithmetical Average Ra |
|---|---|---|---|
| 2C | 0.05 (2) | 0.05 (2) | 0.004 (0.15) |
| 3C | 0.08 (3) | 0.08 (3) | 0.004 (0.15) |
| 5C | 0.13 (5) | 0.13 (5) | 0.005 (0.20) |
| 10C | 0.25 (10) | 0.25 (10) | 0.006 (0.25) |
| 16C | 0.40 (16) | 0.40 (16) | 0.009 (0.35) |
| 24C | 0.61 (24) | 0.61 (24) | 0.013 (0.50) |
| 48C | 1.22 (48) | 1.22 (48) | 0.013 (0.50) |

TABLE 6

Tolerances by grade for ball lots µm (µin.)

| Grade | Allowable Lot Diameter Variation | Nominal Diameter Tolerance | Allowable Ball Gage Deviation High | Low |
|---|---|---|---|---|
| 2C | 0.08 (3) | ±0.51 (±20) | +0.51 (+20) | −0.51 (−20) |
| 3C | 0.13 (5) | ±0.51 (±20) | +0.51 (+20) | −0.51 (−20) |
| 5C | 0.25 (10) | ±0.76 (±30) | +0.76 (+30) | −0.76 (−30) |
| 10C | 0.51 (20) | ±2.54 (±100) | +1.27 (+50) | −1.02 (−40) |
| 16C | 0.80 (32) | ±2.54 (±100) | +1.27 (+50) | −1.02 (−40) |
| 24C | 1.22 (48) | ±2.54 (±100) | +2.54 (+100) | −2.54 (−100) |
| 48C | 2.44 (96) | N/A | N/A | N/A |

The Taguchi method was used in the roughing stage to optimize the process parameters for maximum material removal rate (MRR). The smallest, standard Taguchi 3-level $L_9$ ($3^4$) orthogonal array (OA) (Table 7) which has four 3-level columns available was chosen for this case. The important parameters that influence the MRR generated during mechanical polishing for a given work material and a given abrasive (material and grain size) are (1) the polishing load, (2) the abrasive concentration, and (3) the polishing speed. The MRR obtained with $B_4C$ (500 grit) abrasive is quite high and hence was used in this study. Each factor was investigated at three levels to determine optimum polishing conditions for maximum MRR. The factors and their levels are given in Table 8.

The test was designated by replacing the level numbers 1, 2, 3 of parameters A, B, C, in the $L_9$ OA with the chosen parameter level values in Table 8. The fourth column (factor D) was not used and hence is designated as an unknown parameter in this investigation. Each row of the array represents a parameter setting condition in the experiment. Table 9 shows the test run design and results. All the tests were carried out for a duration of 60 min. each.

TABLE 7

Standard L9 ($3^4$) orthogonal array used in Taguchi method

| Run | A | B | C | D | Results |
|---|---|---|---|---|---|
| 1 | 1 | 1 | 1 | 1 | |
| 2 | 1 | 2 | 2 | 2 | |
| 3 | 1 | 3 | 3 | 3 | |
| 4 | 2 | 1 | 2 | 3 | |
| 5 | 2 | 2 | 3 | 1 | |
| 6 | 2 | 3 | 1 | 2 | |
| 7 | 3 | 1 | 3 | 2 | |
| 8 | 3 | 2 | 1 | 3 | |
| 9 | 3 | 3 | 2 | 1 | |

TABLE 8

Test parameters used and their levels

| Level | A: Load (N/ball) | B: Abr. Conc. (%) | C: Speed (rpm) |
|---|---|---|---|
| 1 | 0.5 | 5 | 300 |
| 2 | 1 | 10 | 400 |
| 3 | 1.5 | 20 | 550 |

TABLE 9

Test run design and results

| Test Run | A: Load (N/ball) | B: Abr. Conc. (%) | C: Speed (rpm) | Not used | Results MRR/ball (mg./min.) |
|---|---|---|---|---|---|
| 1 | 0.5 | 5 | 300 | — | 0.62 |
| 2 | 0.5 | 10 | 400 | — | 1.54 |
| 3 | 0.5 | 20 | 550 | — | 1.09 |
| 4 | 1 | 5 | 400 | — | 1.26 |
| 5 | 1 | 10 | 550 | — | 1.95 |
| 6 | 1 | 20 | 300 | — | 2.03 |
| 7 | 1.5 | 5 | 550 | — | 1.93 |
| 8 | 1.5 | 10 | 300 | — | 1.18 |
| 9 | 1.5 | 20 | 400 | — | 2.91 |

The level average response analysis was carried out by averaging the experimental results obtained from the three test runs corresponding to each level of each parameter, which is shown in Table 10. It can be noted from Table 8 that the 1st level of factor A occurred in test runs 1, 2, and 3 and all three levels of factors B and C appeared once in these three test runs. The 2nd level of factor A occurred in test runs 4, 5, and 6 and all three levels of factors B and C also appeared once in these three test runs. The 3rd level of factor A occurred in test runs 7, 8, and 9 and all three levels of factors B and C also appeared once in these three test runs. This means that the level conditions of factors B and C with different levels of factor A were the same. Hence, it counteracted the effects of factors B and C on the response of Factor A. Thus, from the average data of each of the three test runs wherein one level of factor A occurred, the optimum value of factor A was determined. In the same way, the optimum values for factors B and C were determined.

TABLE 10

Level average response analysis

| Parameter | Test Run | MRR/ball (mg./min.) | Avg. Response (mg/min.) |
|---|---|---|---|
| A, Load, N/ball | | | |
| Level 1, 0.5 | 1 | 0.62 | 1.08 |
| | 2 | 1.54 | |
| | 3 | 1.09 | |
| Level 2, 1 | 4 | 1.26 | 1.75 |
| | 5 | 1.95 | |
| | 6 | 2.03 | |
| Level 3, 1.5 | 7 | 1.93 | 2.01 |
| | 8 | 1.18 | |
| | 9 | 2.91 | |
| B, Abrasive concentration ($B_4C$ 500 grit) % | | | |
| Level 1, 5 | 1 | 0.62 | 1.27 |
| | 4 | 1.26 | |
| | 7 | 1.93 | |
| Level 2, 10 | 2 | 1.54 | 1.56 |
| | 5 | 1.95 | |
| | 8 | 1.18 | |
| Level 3, 20 | 3 | 1.09 | 2.01 |
| | 6 | 2.03 | |
| | 9 | 2.91 | |
| C, Speed, rpm | | | |
| Level 1, 300 | 1 | 0.62 | 1.28 |
| | 6 | 2.03 | |
| | 8 | 1.18 | |

TABLE 10-continued

Level average response analysis

| Parameter | Test Run | MRR/ball (mg./min.) | Avg. Response (mg/min.) |
|---|---|---|---|
| Level 2, 400 | 2 | 1.54 | 1.90 |
|  | 4 | 1.26 |  |
|  | 9 | 2.91 |  |
| Level 3, 550 | 3 | 1.09 | 1.66 |
|  | 5 | 1.95 |  |
|  | 7 | 1.93 |  |

The material removal rate (MRR) increased sharply as the load was increased to 1 N/ball, an increase of 62%. From 1 to 1.5 N/ball, although the load was increased the material removal rate increased only by 15%. The material removal rate increased as the abrasive concentration was increased from 5% to 10%. However, the material removal rate was found to increase considerably with abrasive concentration of 20%. The material removal rate increased by 48% with increased speed from 300 to 400 rpm but decreased by 13% from 400 to 550 rpm. Thus, a speed of 400 rpm was found to be the optimum speed for obtaining high material removal rate. This speed was also found to be the optimum for obtaining good roundness and surface finish. Hence, the speed was kept constant throughout this investigation. Thus, from the level average response analysis, it was found that a load of 1.5 N/ball, an abrasive concentration of 20%, and a speed of 400 rpm would give high material removal rate. This combination of parameters was used in the roughing stage of polishing.

Table 11 gives test conditions and results for ¾ in. $Si_3N_4$ balls from the as-received condition to the finished condition. After polishing with $B_4C$ (500 grit) abrasive in Run 1, the average roundness significantly improved from 25 μm to 1.13 μm after just one run of 2 hours duration. After polishing with $B_4C$ (500 grit) abrasive in Run 1, a significant improvement in the surface finish was also observed. The diameter was reduced from 0.7861 in. (0.7837-0.7889 in.) to 0.7578 in. with $B_4C$ (500 grit) abrasive in Runs 1 to 4. The groove formed on the beveled contacting surface of the upper part of the chamber was machined after these four runs. However, the groove can be maintained till the last run of $B_4C$ (500 grit) abrasive with slightly less removal of material.

TABLE 11

Test details and results

| Stage | Run | Abr. Type | Abr. Size | Abr. % | Load (N/ball) | Speed (rpm) | Time (min.) | Dia. (in.) | Rnd. (μm) | Rnd. Std. Dev. (μm) | S.F. (Ra) (nm) | S.F. (Rt) (μm) | MRR/ball (μm/min.) | MRR/ball (mg/min.) | Remarks |
|---|---|---|---|---|---|---|---|---|---|---|---|---|---|---|---|
| As-received |  |  |  |  |  |  |  | 0.7861 | 24.88 | 7.10 | 937.14 | 6.30 |  |  |  |
| I | 1 | $B_4C$ | 500 | 20 | 1.5 | 400 | 120 | 0.7788 | 1.13 | 0.14 | 105.20 | 0.75 | 1.55 | 2.66 | Groove |
|  | 2 | $B_4C$ | 500 | 20 | 1.5 | 400 | 120 | 0.7727 | 1.63 | 0.13 | 87.50 | 0.66 | 1.29 | 2.43 | Machined |
|  | 3 | $B_4C$ | 500 | 20 | 1.5 | 400 | 180 | 0.7655 | 1.02 | 0.09 | 98.50 | 0.74 | 1.02 | 1.80 |  |
|  | 4 | $B_4C$ | 500 | 20 | 1.5 | 400 | 180 | 0.7578 | 0.76 | 0.10 | 124.80 | 0.98 | 1.09 | 2.11 |  |
|  | 5 | SiC | 600 | 10 | 0.75 | 400 | 120 | 0.7550 | 1.04 | 0.11 | 59.10 | 0.50 | 0.59 | 0.93 | Groove |
|  | 6 | SiC | 600 | 10 | 1 | 400 | 120 | 0.7522 | 0.61 | 0.11 | 75.00 | 0.61 | 0.59 | 0.99 | Continued |
| II | 7 | SiC | 1200 | 5 | 0.75 | 400 | 120 | 0.7515 | 0.36 | 0.06 | 54.90 | 0.42 | 0.15 | 0.28 |  |
|  | 8 | SiC | 1200 | 5 | 0.75 | 400 | 105 | 0.7510 | 0.38 | 0.05 | 59.90 | 0.45 | 0.12 | 0.18 |  |
|  | 9 | SiC | 1200 | 5 | 0.75 | 400 | 105 | 0.7505 | 0.32 | 0.07 | 62.90 | 0.50 | 0.12 | 0.18 |  |
|  | 10 | SiC | 1200 | 5 | 0.5 | 400 | 90 | 0.7503 | 0.34 | 0.04 | 71.20 | 0.52 | 0.06 | 0.15 |  |
|  | 11 | SiC | 1200 | 5 | 0.5 | 400 | 60 | 0.7502 | 0.43 | 0.08 | 69.30 | 0.52 | 0.04 | 0.20 |  |
| III | 12 | SiC | 10,000 | 10 | 0.75 | 400 | 60 | 0.7502 | 0.36 | 0.04 | 49.60 | 0.40 | — | — |  |
|  | 13 | SiC | 10,000 | 10 | 1 | 400 | 105 | 0.7501 | 0.37 | 0.04 | 45.00 | 0.36 | — | — | Groove |
|  | 14 | SiC | 10,000 | 10 | 0.75 | 400 | 60 | 0.7501 | 0.35 | 0.07 | 14.00 | 0.13 | — | — | Machined |
|  | 15 | $CeO_2$ | <5 μm | 10 | 1 | 400 | 120 | 0.7501 | 0.29 | 0.05 | 8.50 | 0.08 | — | — |  |
|  | 16 | $CeO_2$ | <5 μm | 10 | 1 | 400 | 120 | 0.7500 | 0.27 | 0.04 | 8.20 | 0.07 | — | — |  |

After polishing with SiC (600 grit) abrasive in Run 5, the MRR/ball (on ball diameter) dropped from 1 μm/min. to 0.59 μm/min., as the abrasive was changed from $B_4C$ (500 grit) to SiC (600 grit). An improved surface roughness profile (Ra, 59.1 nm and Rt. 0.53 μm) of a $Si_3N_4$ ball was obtained after polishing with SiC (600 grit) abrasive in Run 5. In order to improve the sphericity, the groove formed after Run 5 was not machined. An improved roundness profile (Roundness: 0.6 μm) of a $Si_3N_4$ base was obtained after polishing with SiC (600 grit) abrasive in Run 6. The diameter was reduced to 0.7522 in. with SiC (600 grit) abrasive in Runs 5-6.

An improved roundness profile (Roundness: 0.35 μm) of a $Si_3N_4$ ball was obtained after polishing with SiC (1200 grit) abrasive in Run 7. A surface roughness profile (Ra, 58.8 nm and Rt, 0.38 µm) of a $Si_3N_4$ ball was obtained after polishing with SiC (1200 grit) abrasive in Run 7. The average roundness was maintained at about 0.35 µm in Runs 7 to 11 by continuing the groove formed after Run 5. The diameter was controlled to 0.7502 in. with SiC (1200 grit) abrasive by varying the load and polishing time.

In the final stage, it was found difficult to improve the surface finish rapidly while maintaining the groove formed in earlier runs. A surface roughness profile of Ra, 45.7 mm and Rt. 0.4 µm was obtained after polishing with SiC (10,000 grit) abrasive in Run 12. The groove was machined after Run 13 which resulted in significant improvement in the surface finish in subsequent runs (from 45 to 14 nm Ra). An improved roundness profile (Roundness: 0.25 µm) of a $Si_3N_4$ ball was obtained after polishing with SiC (10,000 grit) abrasive in Run 14. An improved surface roughness profile of 12.6 nm and Rt. 0.12 µm of a $Si_3N_4$ ball was obtained after polishing with SiC (10,000 grit) abrasive in Run 14. The diameter was reduced to 0.7501 with SiC (10,000 grit) abrasive.

An improved roundness profile (Roundness: 0.15 µm) of a ¾ in. $Si_3N_4$ ball was obtained after polishing with $CeO_2$ in Run 16. An improved surface roughness profile of Ra, 7.9 nm and Rt, 0.06 µm of a $Si_3N_4$ ball was obtained after polishing with $CeO_2$ in Run 16 (from 14 to 8.2 nm Ra). The balls were finished to a final diameter of 0.7500 in. with an average roundness of 0.27 µm and average surface finish Ra of 8.2 nm and Rt of 0.7 µm. The final average roundness of the 46 balls was as follows: 19 balls were in the range 0.2-0.25 µm, 17 balls were in the range 0.25-0.3 µm, 8 balls were in the range 0.3-0.35 µm and 2 balls were in the range 0.35-0.4 µm. For the ¾ in. $Si_3N_4$ ball, the best sphericity obtained was 0.15 µm and best surface finish obtained was Ra of 6.7 nm and Rt of 0.05 µm. If need be, the surface finish can further be improved with additional runs using $CeO_2$.

Thus, the three-stage strategy comprising roughing, semi-finishing, and final finishing was successfully implemented using the large batch MFP apparatus for the finishing of a batch of 46, ¾ inch $Si_3N_4$ balls. The three stages are summarized in the following:

1. Roughing: Here, the emphasis was on obtaining a high material removal rate for rapidly reducing the ball diameter and quickly improving the ball geometry. Initially, it is preferable, though not essential, to machine the groove formed on the bevel of the upper part of the chamber for obtaining high removal rates. A load of 1 to 1.5 N/ball, an abrasive concentration of 10-20%, and a speed of 400 rpm was found suitable for obtaining high removal rates (1 to 1.5 µm/min.) using $B_4C$ (500 grit) abrasive. The large batch MFP apparatus was also found to be very effective for improving the sphericity rapidly. The initial average ball sphericity of about 23 µm was significantly improved to about 1 µm after just 2 hours of polishing time. At the end of the $B_4C$ runs, it was found necessary to machine the bevel of the upper part of the chamber, as the groove formed after polishing with $B_4C$ (500 grit) abrasive was quite deep and not quite uniform, as the initial ball size and shape are different. SiC (600 grit) abrasive is suitable at the end of roughing stage to approach the desired diameter. The groove formed after polishing with this abrasive will preferably be maintained till the end of semi-finishing stage as it facilitates improving the sphericity. This may be due to increased rolling motion of the balls resulting in uniform removal of material. The average ball sphericity of about 1 µm was obtained using SiC (600 grit) abrasive by machining the groove. However, this was improved to about 0.6 µm without machining the groove.

2. Semi-finishing: In this stage, the emphasis is on quick reduction in sphericity with a moderate material removal rate. There will typically be no need to remove the groove formed in this stage from run to run as the sphericity can be significantly improved and maintained at a lower value. As a result, the total processing time can also be reduced. An average ball sphericity of about 0.9 µm was obtained using SiC (1200 grit) abrasive by machining the groove. However, this was significantly improved and maintained at about 0.35 µm without machining the groove. It is also possible to reduce the number of runs at this stage by proper selection of the load, abrasive (material, grain size, and concentration), and polishing time.

3. Final finishing: Here, the emphasis is on controlling the final diameter and producing the best surface finish and sphericity. Machining the groove will typically be necessary to improve the surface finish rapidly. Fine SiC (10000 grit) abrasive is very effective prior to chemo-mechanical polishing. An average surface finish Ra of about 45-50 nm was obtained with this abrasive without machining the groove. However, it was significantly improved to about 14 nm in just 1 hour of polishing time after machining the groove. This may be due to increased sliding motion of the balls caused by adequate polishing load on the balls. Finally, chemo-mechanical polishing with $CeO_2$ abrasive resulted in a smooth surface by preferential removal of the peaks from the surface.

An average sphericity of about 0.25 µm (best value 0.15 µm) and an average surface finish, Ra of about 8 nm (best value 6.7 nm) was obtained in the present investigation. Also, the variation in ball diameter, sphericity and surface finish was very small. A polishing time of 20-30 hours (10 to 12 Runs) was adequate to finish a batch from the as-received condition. However, this can be considerably reduced if the initial diameter is closer to the final requirements.

The inventive magnetic float polishing (MFP) apparatus and method are thus particularly efficient and cost effective for finishing large size (¾ in. diameter), large batch (46) $Si_3N_4$ balls suitable for hybrid bearing applications. The inventive apparatus and method can also be used for finishing other sizes (e.g., typically from ⅛ inch to 2 inches in diameter) and types of workpieces including advanced ceramics, such as aluminum oxide, silicon carbide, zirconium oxide, various types of glass, and semiconductor materials. It will therefore be understood that the claims set forth below are not limited to any particular type or size of workpiece unless expressly stated.

The inventive magnetic float polishing apparatus with the inventive self-aligning system is very effective for finishing bearing grade $Si_3N_4$ balls over a wide range of sizes. In addition to the results reported above for ¾ in. diameter $Si_3N_4$ balls, tests have been conducted with $Si_3N_4$ balls of other sizes (½ and ⅜ in. diameter) with similar or superior results. In-situ machining of the upper part of the chamber we performed to improve the geometric accuracy and precise alignment of the magnetic float polishing apparatus.

Thus, the present invention is well adapted to carry out the objectives and attain the ends and advantages mentioned above as well as those inherent therein. While presently preferred embodiments have been described for purposes of this disclosure, numerous changes and modifications will be apparent to those in the art. Such changes and modifications are encompassed within the spirit of this invention as defined by the appended claims.

What is claimed is:

1. A method of polishing workpieces in a magnetic float polishing chamber, said magnetic float polishing chamber comprising a lower chamber piece and an upper chamber piece which is removably receivable in said lower chamber piece, said upper chamber piece being connected to a powered spindle for rotating said upper chamber piece in said lower chamber piece and said method comprising the steps of:
   (a) geometrically aligning said upper chamber piece with said powered spindle by machining said upper chamber piece while said upper chamber piece is connected to and is being rotated by said powered spindle and then
   (b) polishing said workpieces in said lower chamber piece by rotating said upper chamber piece in said lower chamber piece using said powered spindle.

2. The method of claim 1 wherein said upper chamber piece includes a contacting surface for contacting said workpieces and wherein:
   step (b) comprises a first polishing stage wherein said workpieces are polished using a first abrasive material;
   step (b) further comprises a second polishing stage, subsequent to said first polishing stage, wherein said workpieces are polished using a second abrasive material which is less coarse than said first abrasive material;
   said first polishing stage comprises a plurality of polishing runs using said first abrasive material; and
   said method further comprises the step, after at least one of said polishing runs, of machining said contacting surface to remove a groove from said contacting surface prior to beginning a subsequent one of said polishing runs.

3. The method of claim 2 wherein said groove is removed by machining said contacting surface while rotating said upper chamber piece using said powered spindle.

4. The method of claim 2 wherein:
   said second polishing stage comprises at least one polishing run using said second abrasive material and
   subsequent to said step of machining said contacting surface, another groove which forms in said contacting surface prior to said one polishing run of said second polishing stage is maintained in said contacting surface for conducting said one polishing run of said second polishing stage.

5. The method of claim 2 wherein:
   step (b) further comprises a third polishing stage, subsequent to said second polishing stage, wherein said workpieces are polished using a third material which is different from said first abrasive material and said second abrasive material;
   said third polishing stage comprises at least one polishing run using said third material; and
   said method further comprises the step, after said second polishing stage, of re-machining said contacting surface to remove another groove from said contacting surface prior to beginning said one polishing run of said third polishing stage.

6. The method of claim 5 wherein said contacting surface is re-machined while rotating said upper chamber piece using said powered spindle.

7. The method of claim 1 further comprising the step, prior to step (b), of mounting said lower chamber piece beneath said upper chamber piece in a manner effective for causing said lower chamber piece to automatically self-align co-axially with said upper chamber piece during step (b).

8. The method of claim 7 wherein said step of mounting comprises positioning said lower chamber piece on a plurality of roller elements.

9. The method of claim 7 wherein said step of mounting comprises retaining said lower chamber piece using a segment of cord attached to said lower chamber piece at two opposite locations in a manner such that said segment of cord exerts equal and opposite forces on said lower chamber piece at said two opposite locations.

10. The method of claim 9 wherein said segment of cord extends in a first direction at one of said two opposite locations and extends in a second direction at the other of said two opposite locations and wherein said first and said second directions are parallel.

11. A method of polishing workpieces in a magnetic float polishing chamber, said magnetic float polishing chamber comprising a lower chamber piece and an upper chamber piece which is removably receivable in said lower chamber piece, said upper chamber piece having a contacting surface for contacting said workpieces, and said method comprising the steps of:
    (a) performing a first polishing stage wherein said workpieces are polished in said lower chamber piece in the presence of a first abrasive material by rotating said upper chamber piece in said lower chamber piece, said first polishing stage comprising a plurality of first stage polishing runs using said first abrasive material and
    (b) performing a second polishing stage wherein said workpieces are further polished in said lower chamber piece in the presence of a second abrasive material by rotating said upper chamber piece in said lower chamber piece, said second abrasive material being less coarse than said first abrasive material,
    wherein said method further comprises the step, after at least one of said first stage polishing runs, of removing a groove from said contacting surface prior to beginning a subsequent one of said first stage polishing runs.

12. The method of claim 11 wherein said groove is removed by machining said contacting surface.

13. The method of claim 11 wherein:
    said second polishing stage comprises at least one second stage polishing run using said second abrasive material and
    after said step of removing, another groove which forms in said contacting surface prior to said one second stage polishing run is maintained in said contacting surface for conducting said one second stage polishing run.

14. The method of claim 11 further comprising the steps, subsequent to performing said second polishing stage, of:
    performing a third polishing stage wherein said workpieces are further polished in said lower chamber piece in the presence of a third material by rotating said upper chamber piece in said lower chamber piece, said third material being different from said first abrasive material and said second abrasive material and said third polishing stage comprising at least one polishing run using said third material and
    removing another groove from said contacting surface prior to beginning said third stage polishing run.

15. The method of claim 14 wherein said another groove is removed by machining said contacting surface.

16. A method of polishing workpieces in a magnetic float polishing chamber, said magnetic float polishing chamber comprising a lower chamber piece and an upper chamber piece which is removably receivable in said lower chamber piece and said method comprising the steps of:
(a) polishing said workpieces in said lower chamber piece by rotating said upper chamber piece in said lower chamber piece and
(b) prior to step (a), mounting said lower chamber piece beneath said upper chamber piece in a manner effective for causing said lower chamber piece to automatically self-align coaxially with said upper chamber piece during step (a),
wherein said step of mounting comprises retaining said lower chamber piece using a segment of cord attached to said lower chamber piece at two opposite locations in a manner such that said segment of cord exerts equal and opposite forces on said lower chamber piece at said two opposite locations.

17. The method of claim 16 wherein said step of mounting comprises positioning said lower chamber piece on a plurality of roller elements.

18. The method of claim 16 wherein said segment of cord extends in a first direction at one of said two opposite locations and extends in a second direction at the other of said two opposite locations and wherein said first and said second directions are parallel.

* * * * *